United States Patent [19]
Morgado

[11] Patent Number: 4,765,292
[45] Date of Patent: Aug. 23, 1988

[54] SELF-SEALING PISTON APPARATUS

[76] Inventor: Ralph G. Morgado, 33080 Lake Mead Dr., Fremont, Calif. 94536

[21] Appl. No.: 941,372

[22] Filed: Dec. 12, 1986

Related U.S. Application Data

[63] Continuation-in-part of Ser. No. 767,140, Aug. 19, 1985, abandoned.

[51] Int. Cl.⁴ .............................................. F02F 3/00
[52] U.S. Cl. ......................... 123/193 P; 123/197 AB; 92/172; 92/239
[58] Field of Search .......... 123/18 R, 193 R, 193 CP, 123/193 P, 197 AB; 92/172, 179, 239

[56] References Cited

U.S. PATENT DOCUMENTS

| | | | |
|---|---|---|---|
| 1,467,066 | 9/1923 | Prellwitz | 417/231 |
| 2,023,466 | 12/1935 | Crowley | 123/193 CP |
| 2,284,645 | 6/1942 | Duffy | 123/193 CP |
| 2,334,318 | 11/1943 | Donaldson | 92/239 |
| 2,710,137 | 6/1955 | Arnouil | 92/78 |
| 2,985,358 | 5/1961 | Lee et al. | 92/78 |
| 3,078,033 | 2/1963 | Ovrutsky | 417/239 |
| 3,082,935 | 3/1963 | Arak | 92/170 |
| 3,523,001 | 8/1970 | Sylvester et al. | 92/78 |
| 3,695,150 | 10/1972 | Salzmann | 92/169 |
| 3,716,310 | 2/1973 | Guenther | 417/552 |
| 4,178,899 | 12/1979 | Julich | 123/193 P |
| 4,314,531 | 2/1982 | Bruni | 123/193 P |
| 4,383,508 | 5/1983 | Irimajiri et al. | 123/193 P |
| 4,458,555 | 7/1984 | Holtzberg et al. | 123/197 AB |

FOREIGN PATENT DOCUMENTS

| | | |
|---|---|---|
| 334850 | 3/1921 | Fed. Rep. of Germany . |
| 1133388 | 3/1957 | France . |
| 2484041 | 12/1981 | France . |
| 0529885 | 11/1940 | United Kingdom . |

OTHER PUBLICATIONS

Cycle Magazine 9/85, vol. 36, No. 9, pp. 82 & 83.

*Primary Examiner*—Willis R. Wolfe, Jr.
*Attorney, Agent, or Firm*—A. C. Smith

[57] ABSTRACT

A spherically-shaped piston is rigidly attached to a connecting rod for reciprocating and tilting motion within a borehole in response to rotation of a crankshaft having an associated crank which is rotatably attached to the connecting rod. Web and ribs and ridges integrally formed on the hollow, underside of the piston control thermal transfer and deformation to assure continuous perimeter seal with the walls of the borehole over all operating temperatures as the piston sides and tilts within the borehole.

14 Claims, 11 Drawing Sheets

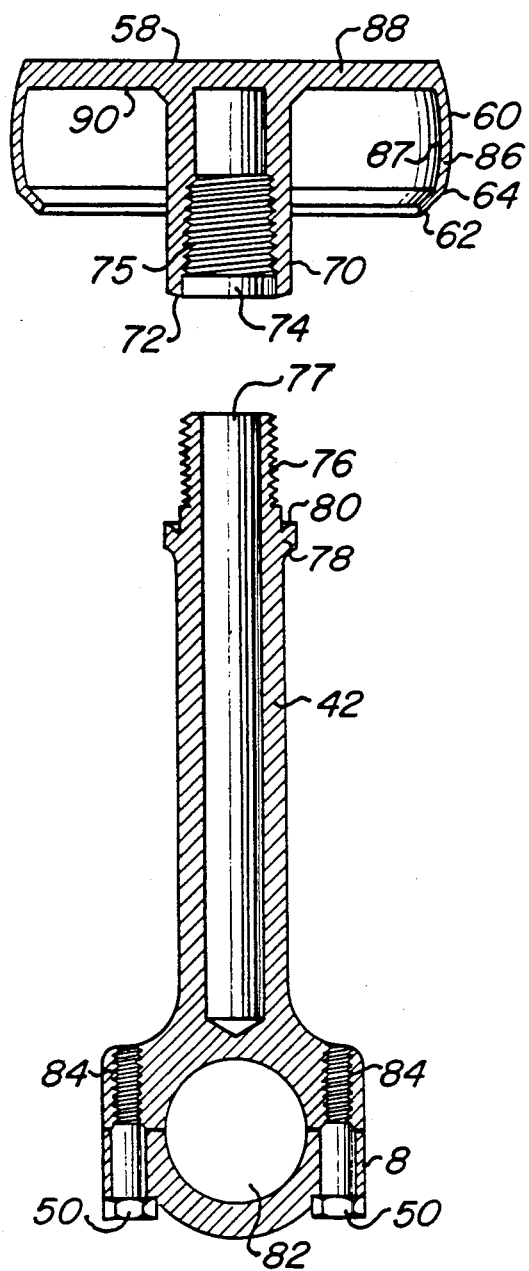
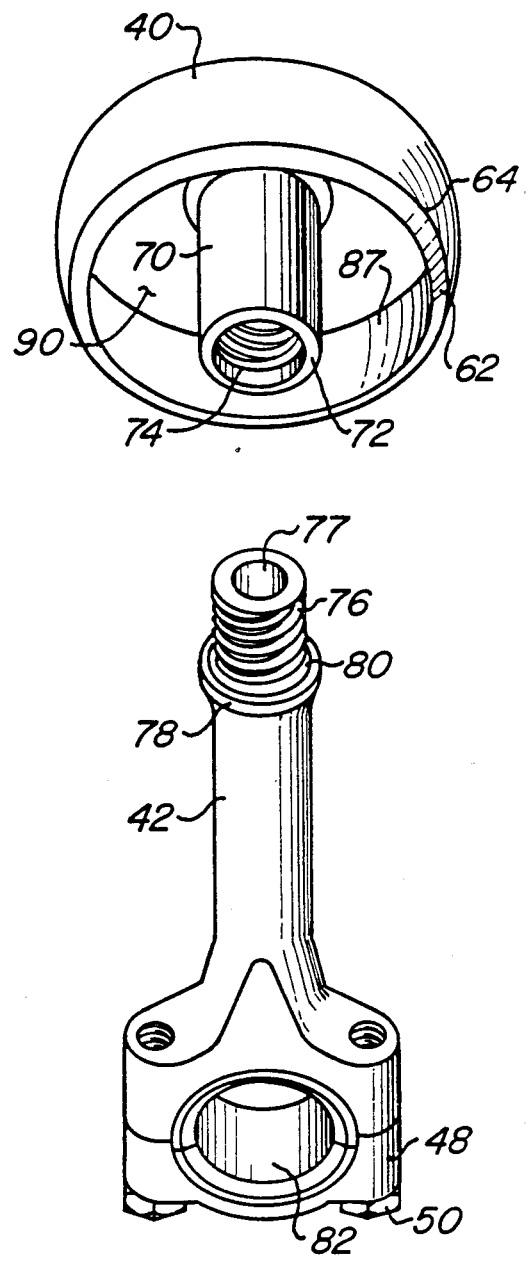
Figure 4
Figure 3

Top Dead Center
(T.D.C.)

90° Past T.D.C.

180° Past T.D.C.

270° Past T.D.C.

SELF-SEALING PISTON APPARATUS

RELATED CASES

This application is a continuation-in-part application of application Ser. No. 767,140, entitled "SELF SEALING PISTON FOR INTERNAL COMBUSTION ENGINES", filed Aug. 19, 1985 by Ralph G. Morgado, now abandoned.

BACKGROUND AND FIELD OF INVENTION

The invention relates to a piston and connecting rod for use in variable volume reciprocating machinery such as pumps, compressors and engines.

In an engine or pump of the type which uses reciprocating pistons, a major disadvantage of the standard piston is its weight. The reciprocating motion causes the piston to change direction often and suddenly and this places very large loads on the connecting rod, bearings and cylinder walls. The inertial forces on the connecting rod and the energy expended to accelerate and decelerate the piston throughout its cycle would be directly reduced by reducing the weight of the piston.

In addition, the connecting rod is subjected to the widest range of reciprocating stresses including compressive loads and the inertial forces from the piston changing directions. These stresses change many times per second. Some of these stresses are directly proportional to the weight of the piston and rod and the rate of change of the velocity. By decreasing the weight of the connecting rod and piston, the force required to change direction is directly decreased. Also, conventional connecting rods are short since they are connected to a lower part of the piston below the piston rings. This creates side forces on the cylinder walls as the connecting rod tilts substantially during the reciprocating motion of the piston in the cylinder.

Another major disadvantage of the standard piston is the need for piston rings to seal the space between the pistons and the cylinder walls. These rings have inherent problems in their design and function, including movement of the rings in their grooves as the piston changes directions. This causes the rings momentarily to lose their seal as the piston moves down the cylinder.

Also, piston rings have gaps which are necessary to mount them on the piston and to maintain tension against the cylinder walls for sealing. Pressure caused by the gases under pressure above the piston forces the gases through these gaps, reducing efficiency and, in engines, increasing emission of pollutants.

Also, the machining of a piston to accept rings and the manufacture of the rings and the labor necessary to install or replace them all increase the cost of conventional reciprocating piston machinery.

A standard piston is attached to the connecting rod by a wrist pin which adds considerable weight to the assembly and requires wrist pin bosses on the skirt or side walls of the piston. These bosses also add significant weight that contributes additional stress on the connecting rod.

The standard piston transfers a substantial amount of its heat to the cylinder walls through its piston rings and the lubricating oil. Very little heat is conveyed to the cylinder walls by the piston skirt. A standard piston skirt is usually made non-circular (out of round) through expensive machining to accommodate uneven expansion due to the need to have more material near the wrist pin bosses and less material away from the bosses.

Also, the drag produced as the piston slide on the cylinder walls causes frictional heating and loss of power. Other piston designs have been disclosed, but these have severe limitations associated with modifications to the cylinder walls, the crank pin, ball and socket joint, seals, complex machining and assembly requirements, and the like. (See, for example, U.S. Pat. Nos. 1,467,066; 2,023,466; 2,136,416; 2,284,645; 2,329,480; 2,710,137; 2,985,358; 3,078,033; 3,082,935; 3,523,001; 3,695,150; 3,716,310; 4,142,500; 4,178,899; 4,246,833; British Pat. No. 529,885; and French Pat. No. 1,133,388.

SUMMARY OF THE INVENTION

In accordance with the present invention, a piston is provided that is lighter, self sealing, more easily replaceable, less expensive and capable of greater volumetric efficiency for the same stroke and bore than conventional pistons. Further, the piston of the present invention can be made shorter and be housed in smaller, less expensive and lighter machinery that can operate at higher speeds without being destroyed. The piston comprises a truncated sphere or oral that is rigidly attached to a connecting rod for tilting and sliding reciprocating motion within a borehole. A plane of continuous perimeter contact is maintained between piston and borehole as the piston tilts and slides therein.

DESCRIPTION OF THE DRAWINGS

FIG. 3 is a partial perspective view of the piston and rod of FIG. 2 disassembled;

FIG. 4 is a half-sectioned side view of the disassembled piston and rod of FIG. 2;

DESCRIPTION OF THE PREFERRED EMBODIMENT

Figure 1:
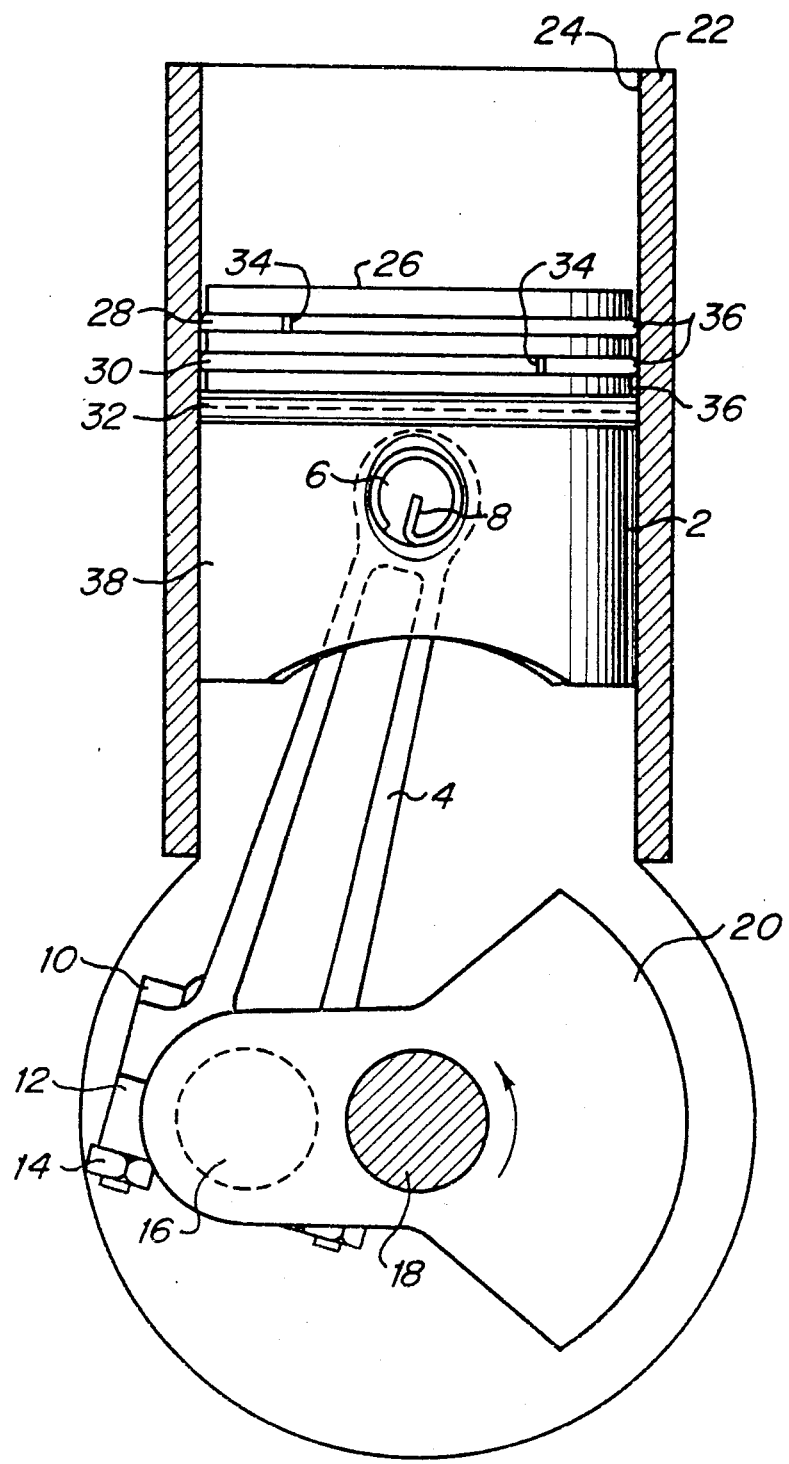
FIG. 1 is a cutaway side view of a conventional engine showing the piston in midstroke.

Referring first to the conventional piston and connecting rod shown in FIG. 1, there is illustrated a cylindrical main body 2, attached to a connecting rod 4 via a wrist pin 6 which is secured from sliding out of the piston 2 by spring clips 8 at each end. The lower end of connecting rod 4 is attached to crank pin 6 on crank shaft 18 via a removable clamping piece 12. Clamping piece 12 is held around crank pin 16 and to connecting rod 4 with bolts 10 and nuts 14. A balance counterweight 20 is mounted on crank shaft 18 opposite the crank pin 16.

Piston 2 slides vertically in cylinder 22. The top side 26 of piston 2 is solid and is shown flat. The upper portion of piston 2 has three piston rings 28, 30, 32 placed in grooves 36 that are machined in piston 2. These rings 28, 30, 32 have gaps 34. The lower portion of piston 2 includes a piston skirt 38 that has greater thickness in the area near the wrist pin 6 and less thickness elsewhere around its circumference.

This conventional piston design necessitates the use of piston rings 28, 30, 32 that have gaps 34 which allow gas blowby and subsequent power loss, and necessitates the use of wrist pin 6 which adds considerable weight and expense to piston 2. Piston 2 must also have skirt 38 to maintain piston 2 vertically in the cylinder 22, and this adds to the weight of piston 2. Skirt 38 also adds length to piston 2, necessitating an area in the engine below cylinder 22 to accommodate the piston at the lowest position of its travel. Piston 2 is able to vibrate considerably in cylinder 22 as it cycles, due to the piston rings 28, 30, 32 moving in their grooves 36 and piston 2 pushing alternately against one side of cylinder 22 on its downstroke and then the other side on its upstroke. This piston design dissipates heat poorly because it is relatively massive and not readily cooled by lubricating oil splashing up from below, and because the piston rings, which have little contact area with cylinder 22 and piston 2, are essentially the only continuously contacting heat conduction pathway from piston 2 to cylinder 22.

Figure 2:
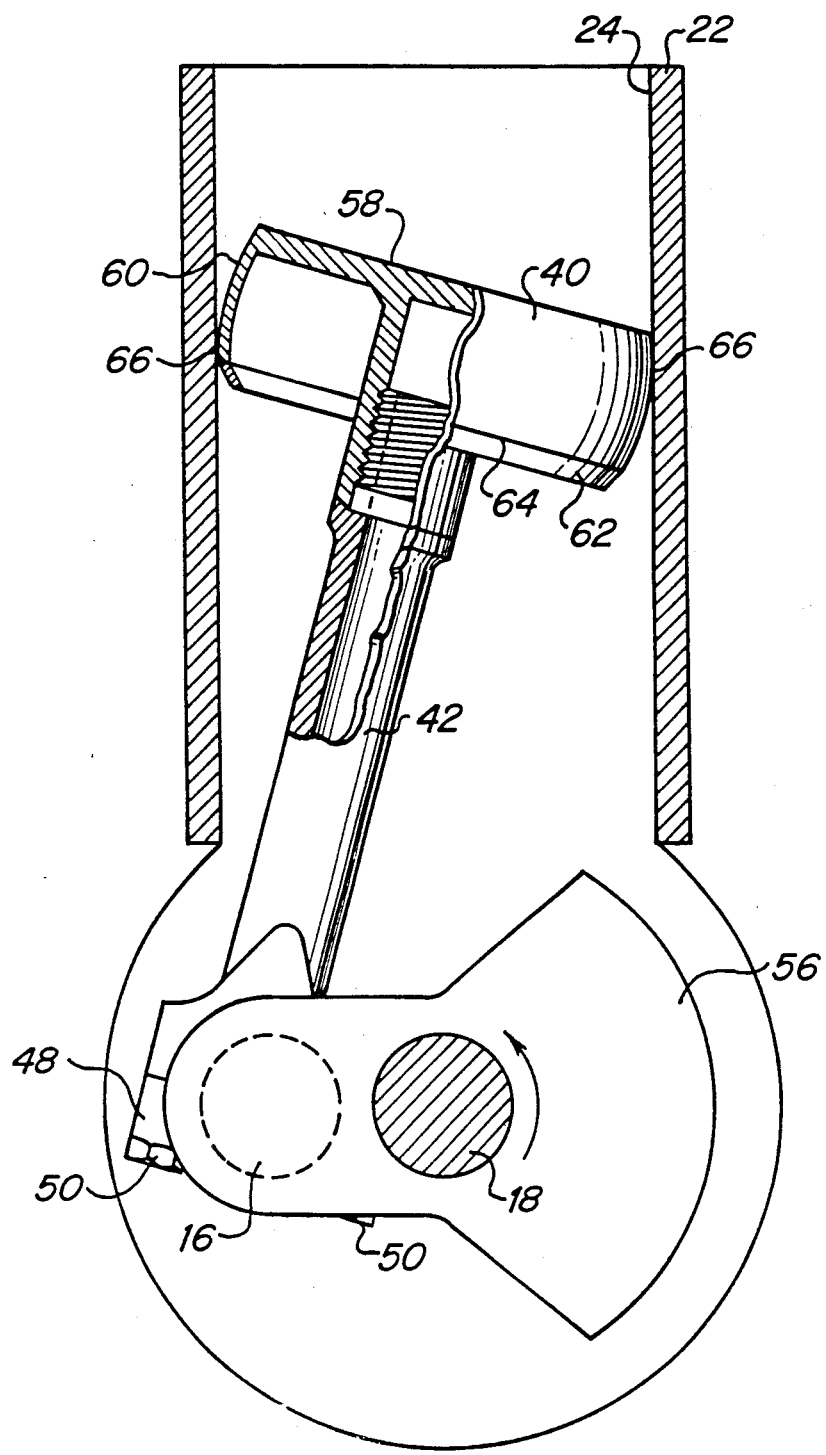
FIG. 2 is a partial, quarter sectional side view of a piston and connecting rod according to one embodiment of the present invention.

Referring now to the illustrated embodiment of FIG. 2, there is shown a piston 40 and a connecting rod assembly 42 according to the present invention. Piston 40 is formed as a segment of a sphere that is disposed to reciprocate inside a cylindrical bore 22 of circular cross section. The spherically-shaped outer wall 60 of the piston 40 rides in contact with inner wall 24 of cylinder 22. The connecting rod 42 is rigidly attached at one end thereof to the piston 40 and is rotatably attached near the other end thereof to a crank pin 16 on a rotatable crank shaft 18. Separable clamping piece 48 is fastened by bolts 50 to rod 42 to hold it to crank pin 16. Piston 40 and connecting rod 42 are counterweighted by a machined area 56 on a crankshaft 18.

Figure 5:
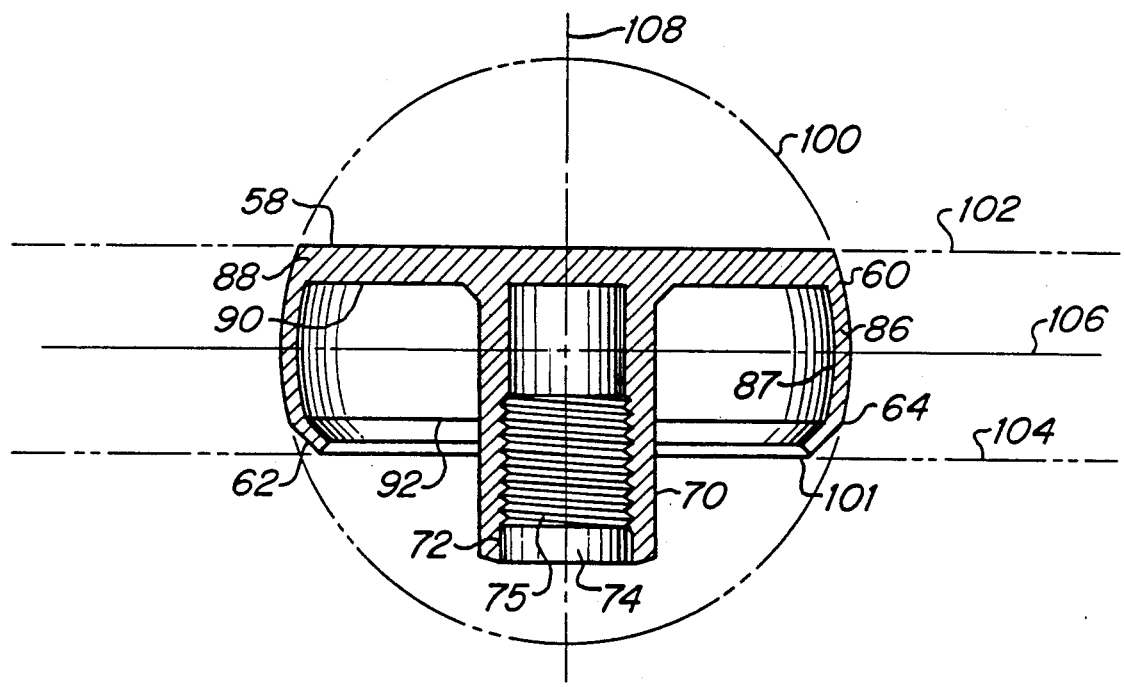
FIG. 5 is a detailed half-sectioned side view of one embodiment of the piston of the present invention.
Figure 14:
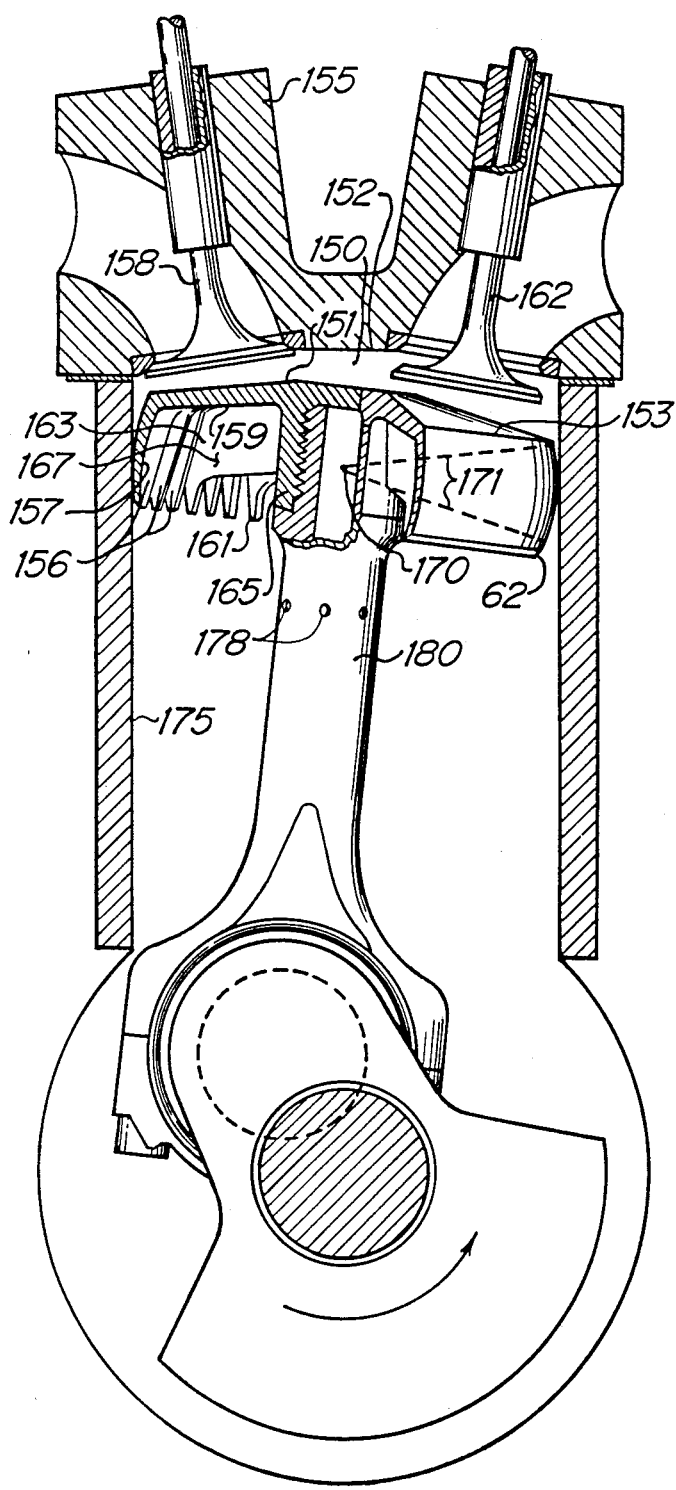
FIG. 14 is a side sectional view of an embodiment of the present invention operating within an internal combustion engine.

As illustrated in FIG. 5, the outer side wall 60 of the piston 40 has the contour of a truncated or sectioned sphere, the diameter of which substantially equals the inside diameter of cylinder 22. The upper or top wall 58 may be flat, as shown in FIG. 2, or may have projections above the plane of truncations that correspond in shape to inner contour of the cylinder head 39, as shown in FIG. 14. The lower edge of the piston sidewall 60 has a short bevel surface 62 which is angled inward towards the center. This angled surface 62, as shown in FIG. 2, forms a definite "break line" 64 with the spherical contour of outer side wall 60. Alternatively, this surface 62 may also be formed by merely decreasing the radius of the contoured outer wall 60 of the piston continuously near the lower edge for reasons later described herein.

FIG. 3 shows a partial perspective view of the piston and rod according to one embodiment of the invention. Piston 40 is shown disassembled from connecting rod 42. Piston 40 and connecting rod 42 may be attached by means of a male threaded portion 76 on the top of connecting rod 42 which mates with a female threaded portion of the stem 70 that is centrally located on the underside surface of the piston top within the hollow interior thereof. The lower edge of stem 70 has a bevelled shoulder 72, and the connecting rod 42 has a mating shoulder 78 below its male threaded portion 76. The upper surface 80 of shoulder 78 on the connecting rod 42 is angled downward towards the center of connecting rod 42 to mate with the angled shoulder 72 on the piston for locking the piston 40 to connecting rod 42 when they are screwed together. The center of the connecting rod can be hollowed out 77 to reduce the weight of connecting rod 42. Connecting rod 42 has a circular opening 82 at its lower end for attachment in conventional manner to the crank pin of a standard crankshaft.

FIG. 4 is a diametrically sectioned view of disassembled piston 40 and connecting rod 42. The inner side walls 87 of the piston may be formed to match the contour of the outer side walls 60 and angled skirt 62 of the piston, and the top of the piston may be thicker than the side wall 86 for strength and to facilitate heat transfer toward the side walls. The inner top wall 90 may follow the contour of the outer top wall 58. FIG. 4 shows the bevelled shoulder 72 and its mating upper angled surface 80 on the connecting rod. The lower portion of the connecting rod has threaded holes 84 on both sides of the crank pin opening 82 to accept bolts 50 which hold the removable lower piece 48 to the main body of connecting rod 42.

Referring now to the sectional view of FIG. 5, the construction of piston 40 is shown in sectioned side view. The outer side walls 60, or skirt of the piston 40, are spherical in form, as shown by a dotted line 100. The upper top wall 58 may be flat, as determined by the upper truncating line or plane 102 which is substantially parallel to a diametrical line or plane 106 of maximum diameter. Alternatively, the top 58 may include projections above the truncating plane, as shown in FIG. 14. The lower edge 101 is determined by lower truncating line or plane 104 which is substantially parallel to line or plane 106. The truncations 102, 104 need not be equidistant from the diametrical line or plane 106. The stem 70 may be positioned on the vertical center line 108 of the sectioned sphere 100, and the side wall 86 has an inner wall 87 which may substantially follow the contour of outer wall 60. Inner wall contour below break line 92 may substantially match the outer wall contour below break line 64.

Figure 6:
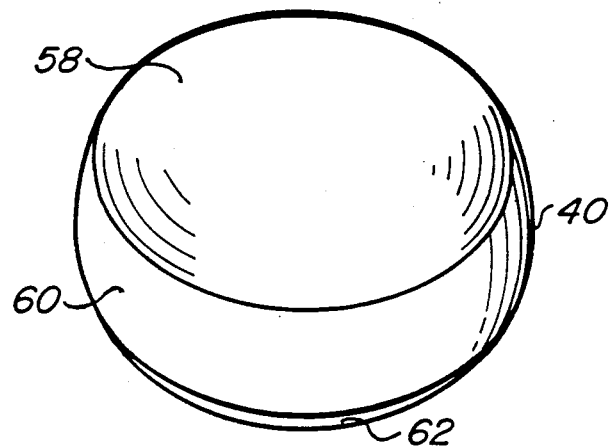
FIG. 6 is a perspective top view of the piston of FIG. 5.
Figure 7:
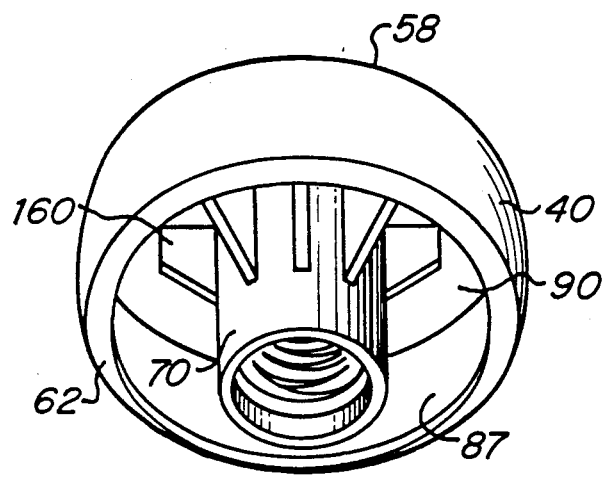
FIG. 7 is a perspective, underside view of an embodiment of the piston of the present invention including web members as a heat transfer mechanism according to the present invention.
Figure 8:
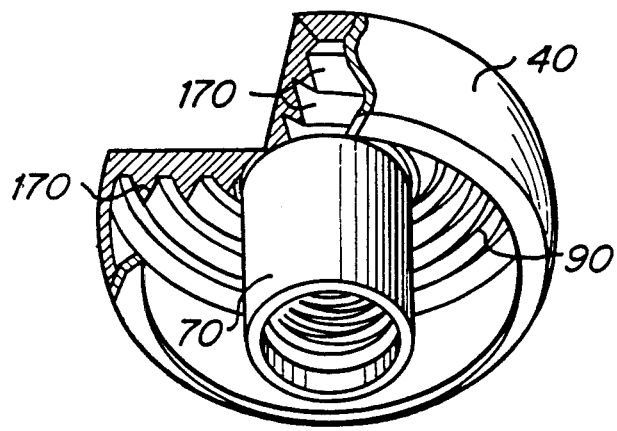
FIG. 8 is a cutaway, perspective view of the piston according to an embodiment of the present invention including concentric grooves for allowing piston flexibility.
Figure 9:
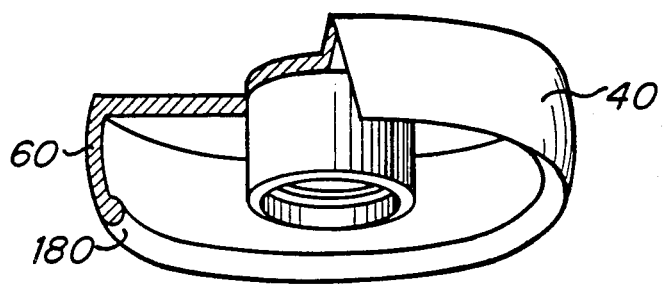
FIG. 9 is a cutaway, perspective view of the piston according to an embodiment of the present invention including a reinforcing bead around its lower edge.

FIG. 6 is a perspective view of the piston showing the top wall 58, piston sidewall 60 and oil directing bevel 62, as viewed from above the piston. FIG. 7 is a perspective view of the under side of piston 40. The vertical fins 160 radiate from piston stem 70 out along the underside of the Piston top 58 (i.e. the piston ceiling 90) toward the inner side wall 87. FIG. 8 is a partial sectioned view of the underside of piston 40 showing concentric fins 170 on piston ceiling 90 positioned concentrically around the piston stem 70. FIG. 9 shows piston 40 with an extra thickness of material 180 along the inside bottom edge of piston side wall 60.

Figures 10, 11:
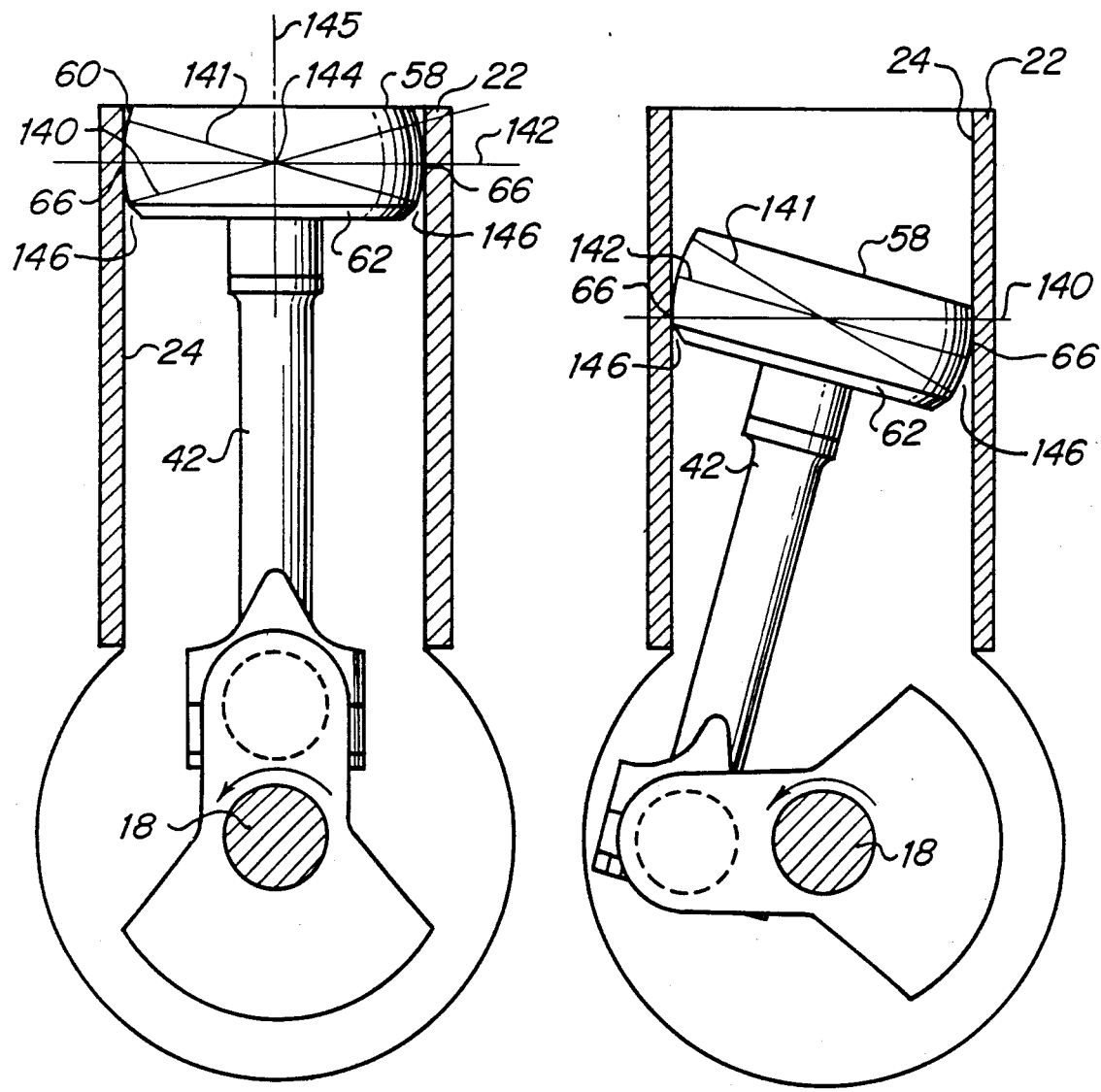
FIGS. 10, 11, 12 and 13 are four successive side views of one embodiment of the present invention as the piston moves in a cylinder.

In FIGS. 10, 11, 12 and 13, the piston 40 and connecting rod 42 are shown in a cylinder 22 in four positions of travel associated with 90 degrees rotational portions of one revolution of crankshaft 18. In FIG. 10, piston 40 is shown with three lines 140, 141, 142 representing planes of continuous contact between the cylinder walls and the piston skirt. These planes pass through a single point 144 on the vertical centerline 145 of piston 40. Line 142 represents a horizontal plane of contact through the maximum diameter of piston 40 when it is located at top dead center. The angles of planes 140 and 141 to plane 142 are determined by the maximum angle of tilt which piston 40 experiences as it reciprocates in the cylinder 22. The continuous band of piston-to-cylinder contact 66 is approximately at the middle of piston skirt when the piston is at top dead center, and a lubricating gap 146 is uniform around piston 40.

FIG. 11 shows the crankshaft 18 rotated 90 degrees, the piston 40 approximately maximally tilted, and line 140 representing the plane of continuous perimeter contact still horizontal. The piston-to-cylinder perimeter contact in the plane represented by line 140 is oriented near the diametric extremes of skirt length of piston 40. Lubricating gap 146 has decreased on one side of piston 40 and increased on the other side of piston 40.

Figures 12, 13:
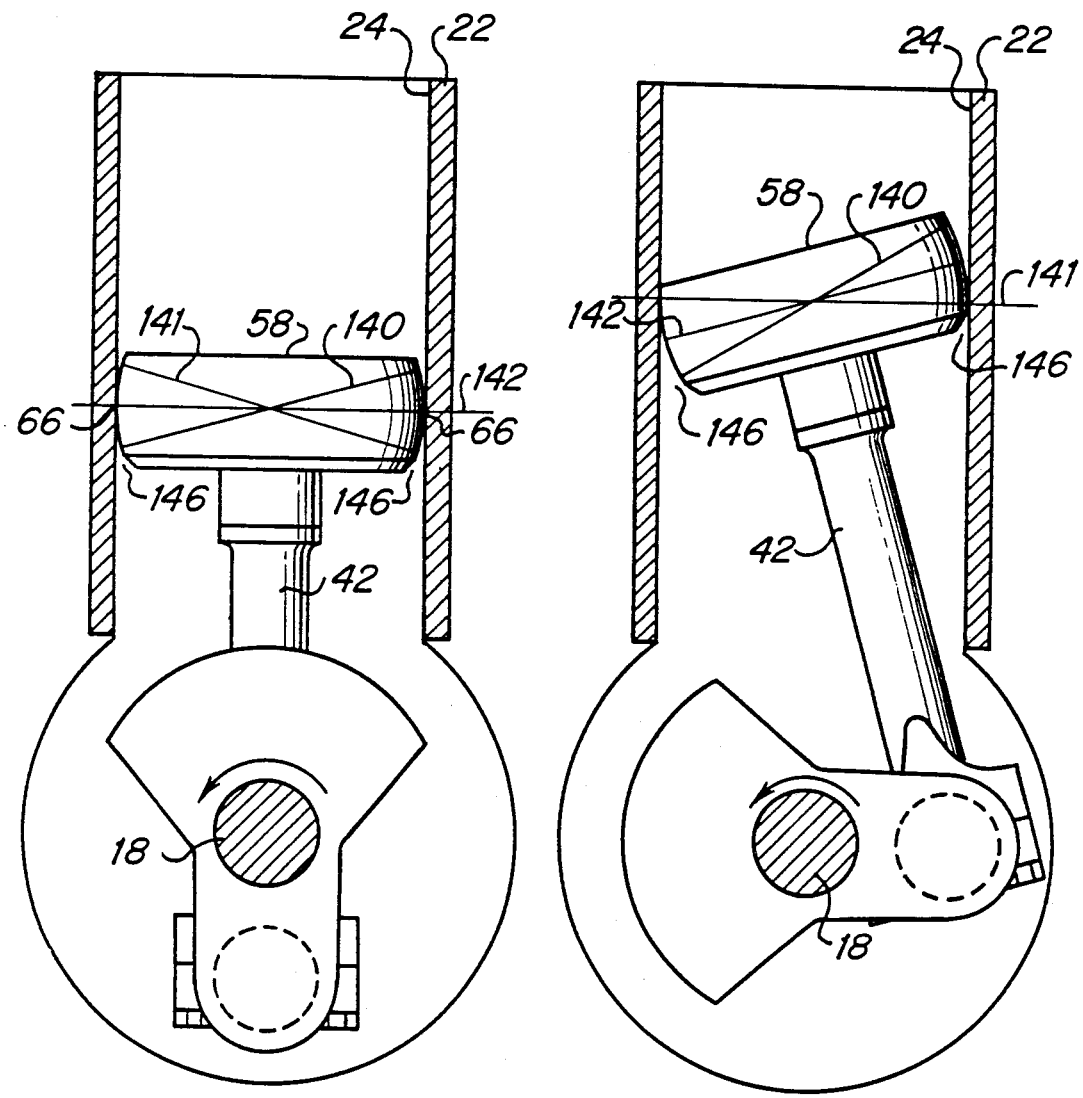

FIG. 12 shows the crankshaft 18 rotated a total of 180 degrees and the piston 40 at the lower dead center. The plane of continuous perimeter contact represented by line 142 remains horizontal and oriented approximately at the middle of the piston skirt. The lubricating gap 146 is uniform around piston 40.

FIG. 13 shows crankshaft 18 rotated a total of 270 degrees, the piston 40 approximately maximally tilted in the opposite direction on its travel up the cylinder, and the line 141 representing the plane of continuous perimeter contact still horizontal. The piston-to-cylinder perimeter contact in the plane represented by line 140 is oriented near the opposite diametric extremes of the skirt length of piston 40. Lubricating gap 146 is decreased on the side which was shown increased in FIG. 11, and increased on the side that was shown decreased in FIG. 11.

As will be apparent the "X-shaped" pattern described by lines or planes 140 and 141 delineate the sliding wear surface of piston 40 in cylinder 22. The length of the skirt of the piston 40 is thus made longer than the arc that is subtended by the intersecting lines or planes 140 and 141. The inner ceiling 90 begins above the arc subtended by the "X-shaped" pattern 140, 141 and the oil-directing bevel 62 begins below the arc subtended by the "X-shaped" pattern 140, 141 at a location close to the lower extremes of the "X-shaped" pattern.

Referring again to FIG. 2, the piston 40 and connecting rod 42 are shown rigidly attached to each other for reciprocating and tilting operation in the cylinder 22. In a conventional internal combustion engine having a cylinder head that forms a combustion chamber above the piston, the upper wall 58 faces the expanding gases in the cylinder and the side walls 60 contact the cylinder wall 24 to seal the expanding gases above piston 40. The piston 40 tilts as it travels down the cylinder 22 because the lower end of connecting rod 42 travels in the circle described by the crank pin 16 on crankshaft 18. During this tilting motion, the plane of continuous perimeter piston 40 with the cylinder wall always remains substantially normal to the cylinder walls 24 because the outer side walls 60 are spherically contoured and the plane of piston-to-cylinder-wall contact 66 varies in location along the side wall 60 within the "X-shaped" pattern as the piston tilts. In this way piston 40 essentially forms its own solid 360 degree 'oil ring' with no gap. Of course, similar sealing action of the piston 40 within a cylinder occurs during operation within a compressor or pump in which fluid is confined and compressed above the piston top 58.

The side walls 60 are formed thin enough to allow slight deformation as the piston expands due to the heat from expanding or compressed gases above piston 40. The side walls 60 are also thinly formed for more rapid cooling by the lubricating oil splashing up from below, and because a thin wall expands less than a thick wall. Thus the difference in the diameters of piston 40 between its hot and its cold conditions is small and close tolerances can be maintained.

Lubricating oil must be kept on cylinder wall 24 to minimize friction and to preserve the continuous seal between cylinder wall 24 and piston side walls or skirt 60. To accomplish this, an oil-directing bevel 62 is incorporated into piston 40 near the lower edge of piston 40 to direct oil, which is being thrown up from the crankcase, to cylinder wall 24 and the lower portion of the "x-shaped" pattern on the outer side walls or skirt 60.

The differences in construction and operation of piston 40 and connecting rod 42 according to the present inventors, and the standard piston 2 as shown in FIG. 1 can now be appreciated. Standard piston 2 does not tilt in its cylinder 2. It has three separate rings 28, 30, 32 (with gaps 34 for installation and expansion) to maintain the seal between cylinder wall 24 and piston 2 and to wipe oil off the cylinder wall 24 as the piston 2 travels downward. In contrast, the skirt 60 of piston 40 of the invention forms its own 360-degree solid seal without any piston rings. Also, standard piston 2 has a long piston skirt 38 and a wrist pin 6 connecting it to connecting rod 4 and requires a long skirt to guide it in its cylinder. It is therefore heavier and requires a longer cylinder 22 to operate. Since piston 40 is lighter than standard piston 2, its counter weight 56 can be made smaller and lighter than the counterweight 20 for standard pistons.

FIG. 7 shows fins 160 rigidly attached to the stem 70 and radiating outwardly. These fins may be integrally formed on the stem 70 and upper inner wall 90 to cool the upper wall, to reduce flexure and expansion, and to add support and rigidity between the stem 70 and the upper inner wall 90.

FIG. 8 shows piston 40 with concentric fins 170 on the upper inner wall 90. These fins may be included to permit slight flexing of the upper inner wall 90 and serve as heat exchangers to pass the heat in piston 40 to the lubricating oil.

FIG. 9 shows piston 40 with an extra thickness of material 180 along the inside bottom edge of piston side wall 60. This extra thickness of material serves to strengthen piston side wall 60 against severe deformation.

In FIGS. 10, 11, 12, 13 the "X-shaped" pattern described by lines or planes 140 and 141 delineate the sliding wear surfaces of piston skirt 60 in cylinder 22. The inner upper wall 90 is disposed above the planes of the "X-shaped" pattern 140, 141, and the oil-directing bevel 62 is disposed below the planes of the "X-shaped" pattern 140 and 141. The bevel 62 should not be disposed any higher than the lower portion of this boundary because the seal formed between cylinder wall 24 and piston 40 would be interrupted at maximum tilt of the piston 40. Also, the bevel 62 should not be disposed significantly lower than the planes of the "X-shaped" pattern because the piston 40 would then be longer and heavier than necessary. This bevel 62 also increases the available passageway 146 between the piston skirt 60 and cylinder wall 24 in which lubricating oil is accumulated near the "X-shaped" wear pattern. After piston 40 is at its maximum tilt, the piston-wall-to-cylinder-wall oil passageway 146 decreases on the high side of piston 40 with continued rotation of the crank shaft 18. Without bevel 62, little oil would reach that critical wear area. Bevel 62 provides a ramp on which the oil rides onto the cylinder wall 24. Therefore, the piston-connecting rod assembly according to the illustrated embodiments of the present invention provide lighter, smoother running apparatus that provides more power or compression efficiency for the same stroke and bore due to better sealing between piston and cylinder wall, which assembly is also less expensive and easier to manufacture than standard piston assemblies.

In accordance with another embodiment of the present invention, as illustrated in FIG. 14, the outer upper wall of the piston may include non-planar shape or contour that corresponds with the internal shape and valving of the cylinder in which it operates. For example, the upper wall of the piston may be dome-shaped, or include an upwardly-extending baffle of conventional design for operation in a 2-cycle engine. Also, the upper wall may vary in thickness and may include integrally formed ribs and web members on the underside of the piston top and inner side of the skirt to enhance or retard deformation or heat expansion to ensure proper fit within the cylinder in which it operates. Further, the connecting rod may be rigidly attached to the piston or may be attached via a keyed shaft instead of by threaded fitting.

Referring now to FIG. 14, there is shown a partially-sectioned perspective view of a preferred embodiment of the self sealing piston of the present invention. The top of the piston 151 may be elevated or dome-shaped above the plane of the upper truncation diameter 153 in corresponding shape to the inner surface of the cylinder head 155 which supports valves 158 and 162 for selective opening and closing in conventional manner. This embodiment of a self sealing piston according to the present invention includes a plurality of vertically-oriented ribs 156 integrally-formed on the inner surface of the piston skirt 157 over substantially the entire length thereof from the inner piston top 159 to the lower edge 161 of the skirt. Additionally, this embodiment includes web members 163 that are integrally-formed with the central stem 165 and inner piston top 159 to radiate outwardly toward the piston skirt where each one integrally joins with a corresponding rib 156 to form a continuous ridge 167 from stem 165 to lower edge 161 of the skirt. The depth of the ridge 167 near the skirt, at least in regions of greatest wear within the "x-shaped" pattern, is selected to be between approximately three-quarters and one-half of the distance between the inner piston top 159 and the level of the lower-most edge of the "x-shaped" pattern. This depth of the ridge 167 assures that the lower-most portion of the piston skirt will retain sufficient flexibility to preserve the continuous perimeter seal with the cylinder wall as the piston expands with heat and pressure. The depth of the ridge 167 may be less than to the level of the swivel point 170 in the "x-shaped" 171 pattern to provide ample skirt flexibility at this point. To control skirt flexibility, the ribs 156 on the inner surface of the skirt taper from the inner piston top 159 to the lower edge 161 of the skirt to provide decreasing rigidity (or increasing flexibility) in the skirt from piston top to lower edge.

Figure 15:
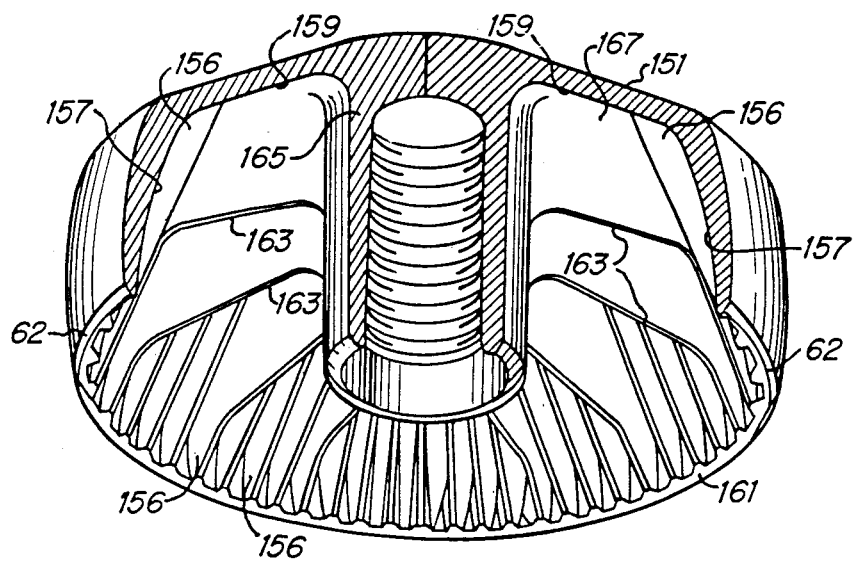
FIG. 15 is a cut-away sectional perspective view of a piston according to the preferred embodiment.
Figure 16:
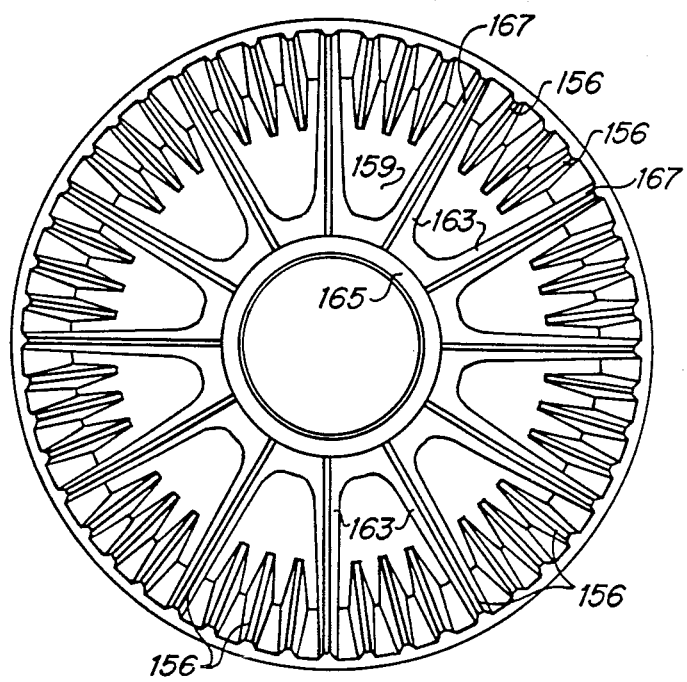
FIG. 16 is a bottom plan view of the piston of FIG. 15.

Referring now to the perspective cut-away view of the piston, as shown in FIG. 15, and to the bottom plan view of the piston, as shown in FIG. 16, and to the cutaway side view of FIG. 14, there is shown the integral formation of outwardly-radiating web members 163 with selected ribs 156 to form the integral ridges 167 from stem 165 to lower edge 161 of the piston skirt uniformly distributed around the stem 165 like the spokes of a wheel. These ridges are significant because the upper surface 151 of the piston is exposed to heat, and the skirts are essentially not so exposed. As the top of the piston undergoes thermal expansion, the skirt presses harder against the cylinder walls 175, about substantially the central plane of perimeter contact serving as a fulcrum, causing the lower edge 161 of the piston to deform inwardly. The continuous ridges 167 to the lower edge 161 limits this thermal deformation to assure substantially uniform outward expansion of the entire skirt to maintain spherical shape and concomitant good perimeter seal with the cylinder walls 175 over all operating temperatures as the piston tilts relative to the vertical axis.

It should be noted that these ridges 167 are tapered in thickness with distance away from the inner piston top 159 to provide controlled heat transfer from the top of the piston outwardly to the skirt and cylinder wall 175 as well as downwardly to the oil that splashes up from below to cool the piston. Also, the ridges 163, 167 and ribs 156 support the shape of the piston against distortion due to thrust loads imposed upon the sides of the skirt under the influence of gas-pressure forces applied to the top of the piston that are opposed by forces in the angled direction as the piston tilts and slides in the cylinder, as shown in FIGS. 10-13. Further, the ridges 167 support the top of the piston 151 from collapsing under the force of expanding or compressing gases on top of the piston. The walls of the piston skirt are tapered in thickness with distance away from the interior piston top 159 to aid in conducting heat in controlled manner from the top of the piston to the cylinder walls 175 in contact with the piston skirt.

The ribs 156 illustrated in these Figures are integrally formed around the interior perimeter of the skirt with tapering cross-sectional dimensions along the lengths thereof from the piston top toward the lower edge of the piston skirt. These ribs enhance the heat transfer from the top of the piston in two ways. First, the ribs 156 conduct heat from the piston top to the piston skirt and from there to the cylinder walls 175. Second, the ribs 156 have substantial surface area which is exposed to the lubricating oil that splashes up under the piston from the crankcase below and that, in one embodiment, is sprayed up under the piston by pressurized oil spraying out of the hollow connecting rod 180 through outlet jets 178. The lubricating oil conducts heat away from the piston onto the cylinder walls and to other cooler regions through which it is circulated in conventional manner. These ribs 156 also control the flexibility of the piston skirt and are spaced uniformly about the interior of the skirt, as illustrated in FIG. 16.

With reference again to FIG. 14, it should be noted that the top of the piston may be shaped to conform substantially to the shape of the chamber 150, as determined by the inner surface 152 of the cylinder head 155. Thus, the piston top need not be a truncation plane (i.e. flat), but may instead include baffles, depressions, hemispherical or rounded shapes, as required to shape the chamber. In engine applications, the piston and connecting rod of the present invention provide the additional benefit of altering the tilt angle of the piston about top dead center to create turbulence within the combustion chamber 150 for more efficient combustion therein of the mixture of air and fuel. Additionally, valves 158 and 162 disposed on opposite sides of the center of the piston may be opened from closed position a few degrees of rotation of the crankshaft sooner due to the tilting motion of the piston top while the piston remain substantially near the top-dead center position in the cylinder.

The piston of the present invention may be formed using spin-casting techniques in which a mold of the piston spins about an axis while molten metal (e.g., aluminum) is poured into the mold through a sprue gate that is vertically oriented along the rotational axis of the mold (which is typically axially aligned with the stem 165). The piston is cast in the mold in topside up orientation. The molten metal is poured through a hole in the bottom of a crucible reservoir of the molten metal that is positioned above the mold, with the hole precisely aligned with the sprue gate. The hole in the crucible reservoir is conventionally valved or gated to supply a sufficient volume of molten metal to completely fill the mold and substantially fill the sprue gate. Metal poured in this manner from an open crucible is less subject to contamination by oxide impurities with concomitant improvement in quality of finished cast piston. Centrifugal force acting upon the molten metal forces the metal into all cavities of the mold. More importantly, in accordance with the preferred embodiment of the present invention, a hyper-eutectic alloy or composition of aluminum and silicon particles is poured into the mold spinning at about 800 revolutions per minute. One suitable hyper-eutectic alloy or composition includes silicon particles of about 20-60 micron size and at least 16-18% by volume of such silicon particles (similar to alloy #390 available commercially from Reynolds Aluminum Company). The silicon particles, which are heavier than aluminum, are thereby forced to pack into the outer regions of the mold to form the piston skirt with highest density of silicon particles distributed on and near the outer surface of the piston skirt. Typical densities of silicon particles to aluminum in the region of the outer surface of the piston skirt range upwardly from at least 18 to 26 percent by volume. The piston, cast according to the present invention, thus constitutes a matrix of silicon particles embedded in aluminum with densely-packed crystallographic structure throughout for good strength and heat transfer properties comparable to forged aluminum, but at substantially reduced manufacturing costs. The piston blank as removed from the mold includes the sprue plug attached to the top of the piston to facilitate subsequent machining.

Because of the hardness and brittleness of silicon particles, the outer surface of the piston skirt may be ground to the spherical shape of selected diameter or cut with a sharp, diamond-pointed tool, and then etched to remove about 0.5 to 1.5 microns thickness of aluminum to expose the silicon particles as the dominant wear surfaces around the outer surfaces of the piston skirt. A diamond-tipped tool is preferred for cutting through the silicon particles to avoid fracturing or shattering the brittle particles. The aluminum in the matrix may be etched away by spraying an alkaline solution (for example, of sodium hydroxide) onto the piston skirt for a controlled period of about 60-75 seconds while the piston is being rotated and after being cut to desired shape. In this way, the self-sealing piston of the present invention is rendered more wear resistant than aluminum alone, and the etched aluminum surface provides excellent adherence properties for the lubricating oil to assure a continuous perimeter seal between piston and cylinder wall that remains well lubricated.

In accordance with another improvement of the present invention, the connecting rod 180 may be formed of plastic materials such as carbon-fiber filled epoxy resin, or polycarbonate materials, or poly (amide-imide) polymer material such as TORLON (available commercially from AMOCO Chemicals Company, Chicago, Ill.), or other castable plastic material of high tensile strength and high resistance to heat and organic solvents. Connecting rods of this type provide the substantial rigidity required and the substantial weight reduction of reciprocating parts. This permits the use of smaller and lighter counter balance 56 on the crankshaft 18 with concomitant overall weight reductions and higher operating speeds compared with conventional pistons and connecting rods.

Figure 17:
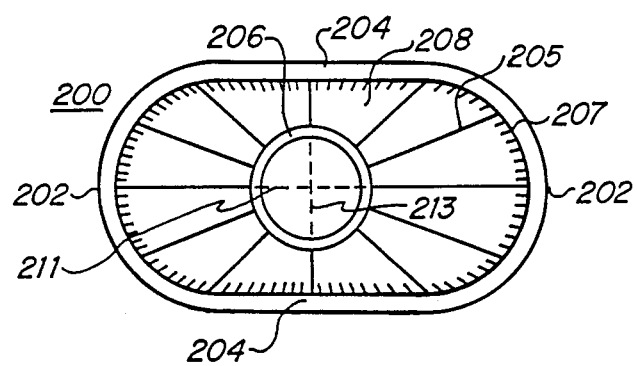
FIG. 17 is a bottom plan view of an oval-shaped piston according to another embodiment of the present invention.

In accordance with another embodiment of the present invention, an oval or elongated piston having a skirt with spherically-shaped end sections and cylindrically-shaped midsection (ovaloidal shape herein) is disposed to reciprocate and tilt within a borehole of the same cross-sectional shape in manner similar to that which was previously described herein in connection with the spherically-shaped piston. Specifically, as shown in the bottom plan views of FIGS. 17 and 18, and in the perspective view of FIG. 19, an oval piston 200, 210, 220 includes a piston skirt which is spherically-shaped at the ends 202, 212, 222 and cylindrically-shaped in the midsection 204, 214, 224. In the emodiment of FIG. 17, the centrally-oriented stem 206 is integrally formed with the inner top wall 208 of the piston, and the webs 205 that 'radiate' outwardly from the stem 206, and the ribs 207 that are vertically oriented on the inner surfaces of the skirt, are all integrally-formed as a portion of the piston in the manner, and for the reasons substantially as described in connection with the embodiment illustrated in FIGS. 14, 15 and 16.

The oval piston illustrated in FIG. 18 includes two stems 216 shown centered at approximately ¼ and ¾ the length of the piston along the major axis 211, and with ribs 217 and webs 215 integrally formed with the stem and inner piston top 218 substantially as described in connection with the embodiments illustrated in FIGS. 14, 15, 16 and 17.

The simplified perspective view in FIG. 19 of the embodiment of the invention illustrated in FIG. 18 omits the ribs 217 and shows only partial webs 215 for the purposes of preserving clarity, but it should be understood that integral webs and ribs of the type illustrated and described in connection with the embodiments shown in FIGS. 14, 15, 16, 17 and 18 may also be included.

Figure 18:
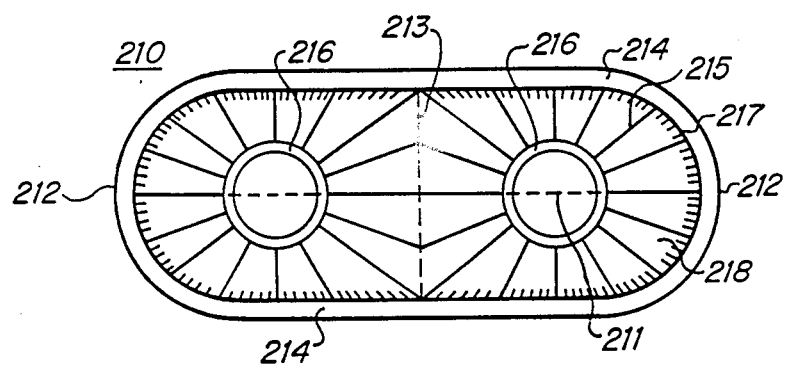
FIG. 18 is a bottom plan view of another oval-shaped piston according to the present invention.
Figure 19:
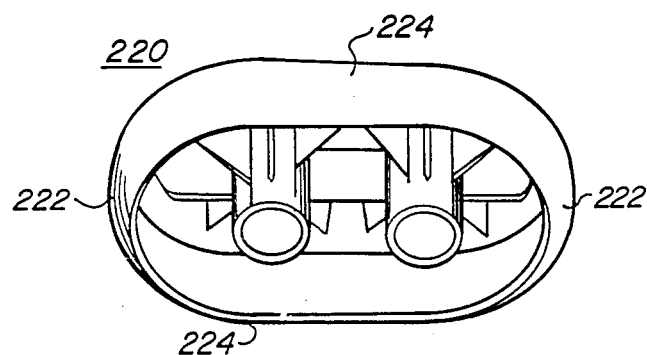
FIG. 19 is a simplified perspective view of the piston of FIG. 18.

In each embodiment illustrated in the FIGS. 17, 18 and 19, the oval piston includes a major axis 211 along the long dimension and a minor axis substantially normal to the major axis approximately midway the length of the major axis.

Of course, an ellipsoidal piston having continuously-changing radii of curvature, and major and minor axes may also be used within a borehole of the same cross-sectional shape.

In each embodiment of the oval-shaped (or ellipse-shaped) piston, the top surface area of the piston and the associated cross-sectional area of the borehole are all conducive to introducing many valves into a cylinder head 155 that confines the volume of the cylinder and piston in the manner as shown in FIG. 14. A large number, for example, six or eight or more valves 158, 162 (for intake and exhaust in engine applications) thus assembled in the cylinder head 155 greatly reduces the pressure drop between the confined volume of the cylinder and the intake- or exhaust-manifolds for improved naturally-aspirated engine applications, or the like.

The large number of valves permits each of such valves to be smaller and lighter, and this reduction in weight and mass dramatically reduces the tendency of the small valves to 'float' into closed position at high operating speeds. Also, the large number of smaller valves tends to pack or position better within the cross-sectional shape of the combustion chamber to assist in transferring as much fuel-air mixture into the combustion chamber as possible within the shortest possible piston travel in order to improve high speed operation.

In the embodiment illustrated in FIG. 17, the single stem 206 is attached to a connecting rod with the major axis 211 aligned either normal to the rotational axis of an associated crank shaft, or parallel thereto. In the embodiments illustrated in FIGS. 18 and 19, the plural number of stems 216 each connect to a connecting rod with the major axis 211 aligned parallel to the rotational axis of an associated crankshaft, with the lower end of each connecting rod attached to the same (or an angularly synchronized) eccentric on the crankshaft. Two connecting rods permits distribution of the forces acting on the piston top to be substantially equally distributed on two lightweight connecting rods to prevent significant distortion of the shape of the piston while preserving the lightweight operation therof.

It is desirable to align the long or major axis of the oval piston with the rotational axis of the associated crankshaft to orient the pivot points of the 'X-shaped' wear pattern (similar to point 170 in the spherical piston of FIG. 14) are on the spherical end in line with the crankshaft. This orientation establishes less tilting motion and wearing motion on the midsection surfaces of the piston skirt. Alternatively, the long or major axis of oval piston may be oriented perpendicular to the rotational axis of the crankshaft so that the pivot point of the 'X-shaped' wear patterns are disposed in the midsections of the piston skirt. In this alternative embodiment, the spherical end sections of the oval piston undergo maximum tilt motion, requiring a longer piston skirt at least in the end sections, but producing greatest turbulence within the combustion chamber near the top dead-center position of the piston in its operating cycle. Also, this orientation of the oval piston is conducive to reducing the overall length of a large-displacement engine. In addition, because of the large tilt motion of the piston near top dead center in this orientation, exhaust valve(s) disposed near the end section which is tilted and depressed on the upstroke may remain open longer into the tilted, depressed volume, and may close later as the piston tilts during crank rotation through top dead center. Similarly, intake valve(s) disposed near the opposite end section may be opened earlier into the tilted, depressed volume of the piston as the associated crankshaft continues to rotate beyond top dead center. These valving and piston-tilting motions contribute to more efficient and more complete evacuation and charging of the combustion chamber for improved engine operation over a wider range of speeds.

Figure 20:
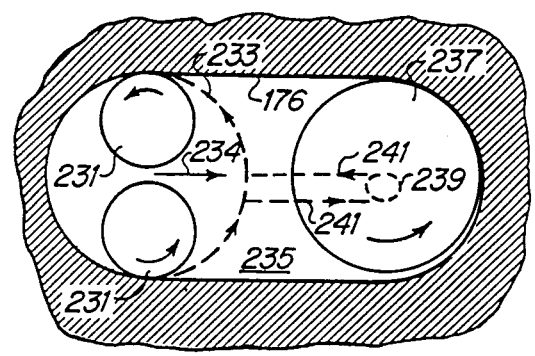
FIG. 20 is a simplified top view illustrating the scheme for forming an oval-shaped borehole.
Figure 21:
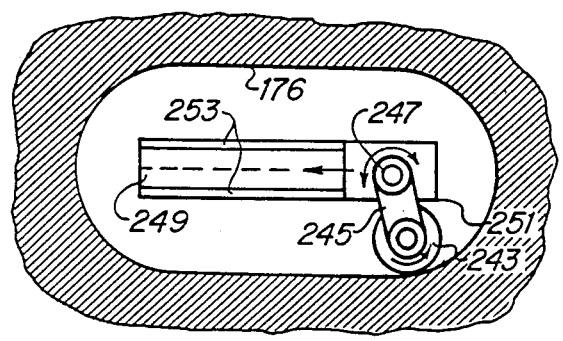
FIG. 21 is a simplified top view of the apparatus for forming the oval-shaped borehole.

In accordance with the embodiment of the invention illustrated in FIGS. 20 and 21, there are shown pictorial top views of apparatus for grinding the borehole 176 with circular end sections and rectangular midsection. Specifically, the circular end sections may be ground to right, cylindrical shape with the desired depth using grinding wheel or cutter 231 (of smaller diameter than the cylindrical diameter) which is mounted to rotate and move in a circular path with its outer diameter travelling in the circular path 233 of desired diameter. The entire mounting for the grinding wheel or cutter 231 is disposed to move transitionally 234 along the major axis of the oval to cut the walls of the rectangular mid section 235. At the remote end, the grinding wheel or cutter 231 is again constrained to move along a circular path, as previously described, to form the opposite end section of right, cylindrical shape. Of course, one large grinding wheel or cutter 237 (having diameter less than the diameter of the cylindrical end section) may rotate and move in a circular path 239 so that the perimeter thereof forms the desired right, cylindrical end section of the borehole 176. The grinding wheel or cutter 237 is then disposed to move translationally 241 in parallel with the major axis of the borehole 176 back and forth between the circular end sections 241 in order to form the parallel walls of the rectangualr midsection 235. Of course, the cutter or grinding wheel 231, 237 in each such embodiment may be as long as is desired to form the desired depth of borehole 176 in one or many passes.

Referring now to the simplified pictorial top view of FIG. 21, there is shown an embodiment of the apparatus for forming the oval-shaped borehole 176. Specifically, one grinding wheel or cutter 243 is mounted on arm 245 and is powered to rotate at high speed as the arm is rotated about central axis 247. This action forms the circular end section and the arm 245 is then fixed in lateral position (i.e. its axis normal to the major axis 249) as the mount 251 moves along rails 253 in parallel with the major axis 249 to cut one side wall in the midsection. At the opposite end of travel, the arm 245 is rotated about its axis 247 as the cutter forms the opposite end section of circular shape. Then the arm 245 is fixed in opposite lateral position as the mount 251 moves back along rails 253 to cut the opposite, parallel side wall in the midsection. Of course, the cutter or grinding wheel 243 may be as long as is desired to form the borehole of desired depth.

Therefore, the method and apparatus of the present invention provides reciprocating sliding and tilting motion of a lightweight piston and rigidly-attached connecting rod within an elongated borehole in response to rotation of a crankshaft that includes an eccentric crank rotatably attached to the connecting rod. A continuous perimeter seal is maintained between the walls of the borehole and the piston skirt in a plane that remains substantially normal to the walls of the borehole as the piston reciprocates and tilts therein. Heat transfer means are included in the piston and connecting rod to assure that the piston skirt maintains proper shape to maintain the continuous seal under all operating temperatures.

I claim:

1. Piston apparatus for reciprocating, sliding motion within a cylindrical bore in response to rotation of an eccentric crank about an axis that is normal to the cylindrical bore, the piston apparatus comprising:
   a piston disposed within the cylindrical bore and having a substantially frusto-spherical shape with a plane therethrough of maximum diameter that is substantially equal to the diameter of the cylindrical bore, and having upper and lower truncation diameters less than said maximum diameter for maintaining a substantially continuous normal plane of sealing contact with the cylindrical bore during reciprocatingly sliding and tilting motion of the piston therein, said piston having an integrally-formed solid top near the upper truncation and a hollow interior that is open at the lower truncation to integrally form a skirt of the piston which has a spherical outer surface and having a stem integrally formed with the solid top to extend downwardly therefrom in a central location within the hollow interior;
   a plurality of ribs integrally formed on substantially the entire length of the interior surface of the skirt oriented in a direction between the upper and lower truncation diameters;
   a plurality of web members integrally formed within the hollow interior of the piston on the solid top to radiate outwardly from said stem toward the piston skirt to connect with selected ribs to integrally form substantially continuous ridges within the hollow interior underside of the piston from the stem to the skirt of the piston; and
   connecting rod means rigidly attached axially at one end thereof to said stem and rotatably attached near the other end thereof to the eccentric crank for reciprocatingly sliding and tilting the piston within the cylindrical bore in response to rotation of the crank.

2. Piston apparatus as in claim 1 wherein the depth of said web members near the communication thereof with ribs on said skirt is less than the length of the skirt between upper and lower truncations.

3. Piston apparatus as in claim 1 wherein said stem is integrally formed with the solid top to extend downwardly therefrom substantially equidistantly above and below said plane of maximum diameter about which the piston undergoes said tilting motion; and
   said connecting rod means is rigidly attached to said stem substantially about said plane of maximum diameter and is formed of a polymeric matrial selected from the group consisting of carbon-filled epoxy resins, polycarbonates, and poly (amide-imide) polymers.

4. Piston apparatus as in claim 1 wherein the plurality of ribs exceeds the plurality of web members.

5. Piston apparatus as in claim 1 wherein said piston and web members and stem and skirt and ribs are integrally formed of a composition including aluminum and silicon in which the density of silicon in aluminum increases with distance from a central location near the stem to higher density near the skirt.

6. Piston apparatus as in claim 5 wherein said composition includes silicon particles in the range of about 20 to 60 microns size distributed in the aluminum.

7. Piston apparatus as in claim 5 wherein the density of silicon in aluminum near the skirt is in the range from about 18 to about 26 percent by volume.

8. Variable volume apparatus comprising:
   a body having a borehole therein along a primary axis, said borehole having an oval cross section in a plane that is normal to the primary axis, the oval cross section being oriented with a major axis of major dimension and a minor axis of minor dimension that is less than said major dimension and that is oriented normal to the major axis;
   a shaft including an eccentric crank supported on said body for rotation about an axis that is normal to said primary axis and aligned with the major axis;
   a piston disposed within the borehole for reciprocating, sliding motion therein along said primary axis in response to rotation of said shaft, said piston having a substantially frusto-ovaloidal shape having a cross-sectional shape substantially equal to the cross-sectional shape of the borehole and oriented therein with major and minor axes of the borehole aligned with corresponding major and minor axes of the piston, and having upper and lower truncations spaced away from the plane of maximum major and minor dimensions for providing a substantially continuous plane of sealing contact with the borehole that is normal to the primary axis during reciprocatingly sliding and tilting motion of the piston in the borehole, said piston having an integrally-formed solid top near the upper truncation and a hollow interior that is open at the lower truncation to integrally form a skirt of the piston with ovaloidal surfaces, said piston having a stem integrally formed with the solid top to extend downwardly therefrom in a central location within the hollow interior;
   a plurality of ribs integrally formed on substantially the entire length of the interior surface of the skirt oriented in a direction between the upper and lower truncations;
   a plurality of web members integrally formed within the hollow interior of the piston on the solid top to radiate outwardly from said stem toward the piston skirt to connect with selected ribs to integrally form substantially continuous ridges within the hollow interior underside of the piston from the stem to the skirt of the piston; and
   a single connecting rod rigidly attached axially at one end thereof to said stem and rotatably attached near the other end thereof to the eccentric crank for reciprocatingly sliding and tilting the piston within the borehole in response to rotation of said shaft.

9. Variable volume apparatus as in claim 8 wherein the depth of said web members near the connection thereof with ribs on said skirt is less than the length of the skirt between upper and lower truncations.

10. Variable volume apparatus as in claim 8 wherein said stem is integrally formed with the solid top to extend downwardly therefrom substantially equidistantly above and below said plane of maximum major and minor dimensions about which the piston undergoes said tilting motion; and said single connecting rod is rigidly attached to said stem substantially about said plane of maximum major and minor dimensions and is formed of a polymeric material selected from the group consisting of carbon-filled epoxy resins, polycarbonates, and poly (amide-imide) polymers.

11. Piston apparatus as in claim 8 wherein the plurality of ribs exceeds the plurality of web members.

12. Variable volume apparatus as in claim 8 wherein said piston and web members and stem and skirt and ribs are integrally formed of a composition including aluminum and silicon in which the density of silicon in aluminum increases with distance from a central location near the stem to higher density near the skirt.

13. Piston apparatus as in claim 12 wherein said composition includes silicon particles in the range of about 20 to 60 micron size distributed in the aluminum.

14. Piston apparatus as in claim 12 wherein the density of silicon in aluminum near the skirt is in the range from about 18 to about 26 percent by volume.

* * * * *